(12) United States Patent
Cho

(10) Patent No.: US 9,731,708 B2
(45) Date of Patent: Aug. 15, 2017

(54) STARTUP CONTROL METHOD FOR HYBRID VEHICLE

(71) Applicant: HYUNDAI MOTOR COMPANY, Seoul (KR)

(72) Inventor: Sung Hyun Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/084,676

(22) Filed: Mar. 30, 2016

(65) Prior Publication Data

US 2017/0137017 A1     May 18, 2017

(30) Foreign Application Priority Data

Nov. 18, 2015    (KR) .................. 10-2015-0161445

(51) Int. Cl.
*B60W 10/08* (2006.01)
*B60W 20/15* (2016.01)
*B60K 6/52* (2007.10)
*B60W 20/13* (2016.01)
*B60W 10/06* (2006.01)
(Continued)

(52) U.S. Cl.
CPC ............ *B60W 20/15* (2016.01); *B60K 6/52* (2013.01); *B60W 10/06* (2013.01); *B60W 10/08* (2013.01); *B60W 10/10* (2013.01); *B60W 10/30* (2013.01); *B60W 20/13* (2016.01); *B60W 2510/0642* (2013.01); *B60W 2510/244* (2013.01); *B60W 2520/10* (2013.01); *B60W 2710/027* (2013.01); *B60W 2710/0666* (2013.01); *B60Y 2200/92* (2013.01); *B60Y 2300/18025* (2013.01); *B60Y 2300/192* (2013.01); *B60Y 2400/82* (2013.01); *Y10S 903/916* (2013.01); *Y10S 903/93* (2013.01)

(58) Field of Classification Search
None
See application file for complete search history.

(56) References Cited

U.S. PATENT DOCUMENTS 6,712,734 B1 * 3/2004 Loeffler .................. B60K 6/36
                                                                477/5
6,974,402 B2 * 12/2005 Colvin .................. B60K 6/365
                                                                477/5

(Continued)

FOREIGN PATENT DOCUMENTS

JP        2005-53317       3/2005
JP        2006-136135 A    5/2006
(Continued)

*Primary Examiner* — Dirk Wright
(74) *Attorney, Agent, or Firm* — Brinks Gilson & Lione

(57) ABSTRACT

Disclosed is a startup control method for a hybrid vehicle, the method including judging, by a controller, whether starting motion of the vehicle is possible using only a motor or whether starting motion of the vehicle additionally requires power of an engine, preparing the power of the engine, by the controller, by igniting the engine and also initiating engagement of a driving gear when it is judged that starting motion of the vehicle additionally requires the power of the engine, and linearly increasing a torque of the motor to a maximum value, and completing the remainder of a motion start process by increasing a torque of a clutch while increasing a torque of the engine, by the controller, when transmission of the power of the engine to a drive wheel becomes possible via the preparation of the power of the engine.

7 Claims, 3 Drawing Sheets

(51) Int. Cl.
*B60W 10/10* (2012.01)
*B60W 10/30* (2006.01)

(56) References Cited

U.S. PATENT DOCUMENTS

| | | | | |
|---|---|---|---|---|
| 7,347,803 | B2* | 3/2008 | Kobayashi | B60K 6/48 |
| | | | | 192/48.8 |
| 7,722,499 | B2* | 5/2010 | Soliman | B60K 6/445 |
| | | | | 477/181 |
| 7,828,694 | B2* | 11/2010 | Silveri | B60K 6/485 |
| | | | | 290/40 C |
| 8,388,494 | B2* | 3/2013 | Schiele | B60K 6/48 |
| | | | | 477/101 |
| 8,690,728 | B2* | 4/2014 | Griffin | B60W 10/02 |
| | | | | 477/77 |
| 8,858,391 | B2* | 10/2014 | Tolkacz | B60K 17/02 |
| | | | | 180/65.22 |
| 9,005,077 | B2* | 4/2015 | Kim | B60K 6/52 |
| | | | | 180/65.28 |
| 9,434,372 | B2* | 9/2016 | Iwasa | B60K 6/48 |
| 2016/0052509 | A1* | 2/2016 | Yamazaki | B60W 10/08 |
| | | | | 477/5 |

FOREIGN PATENT DOCUMENTS

| | | |
|---|---|---|
| JP | 2007-112195 | 5/2007 |
| JP | 2013-071562 A | 4/2013 |
| JP | 5223603 B2 | 6/2013 |
| JP | 5391654 B2 | 1/2014 |
| JP | 2015-140125 A | 8/2015 |
| KR | 10-2013-0059202 | 6/2013 |
| KR | 10-2014-0059613 A | 5/2014 |
| KR | 10-2014-0079157 A | 6/2014 |

\* cited by examiner

STARTUP CONTROL METHOD FOR HYBRID VEHICLE

CROSS-REFERENCE TO RELATED APPLICATION

This application claims priority to Korean Patent Application No. 10-2015-0161445, filed on Nov. 18, 2015 in the Korean Intellectual Property Office, the entire disclosure of which is incorporated herein by reference.

BACKGROUND

1. Field of the Invention

The present disclosure relates to a startup control method for a hybrid vehicle, and more particularly, to a startup control method for a hybrid vehicle in which any one of a front wheel or a rear wheel is driven by an internal combustion engine and the other one is driven by an electrically operated motor.

2. Description of the Related Art

Among hybrid vehicles, there is a four-wheel vehicle configured such that two front wheels and two rear wheels of the vehicle are respectively driven by different power sources.

That is, the two front wheels may be driven by an internal combustion engine and the two rear wheels may be driven by a motor, so that the vehicle is driven only by the engine or Electric Vehicle (EV) driving is implemented using only the motor as needed, or all of the front wheels and the rear wheels are driven so as to implement four-wheel Hybrid Electric Vehicle (HEV) driving.

In a hybrid vehicle configured as described above, the power of the engine is transmitted to the drive wheels via, for example, an Automated Manual Transmission (AMT) or Dual Clutch Transmission (DCT). When the vehicle starts motion, a clutch provided in the AMT or the DCT may overheat, or a linear acceleration sensation may be problematic.

The matters disclosed in this section is merely for enhancement of understanding of the general background of the invention and should not be taken as an acknowledgment or any form of suggestion that the matters form the related art already known to a person skilled in the art.

SUMMARY

Therefore, the present disclosure has been made in view of the above problems, and it is an object of the present invention to provide a startup control method for a hybrid vehicle in which some drive wheels are driven by a motor and the other drive wheels are driven by an engine, the method ensuring rapid startup and a linear shift sensation and preventing clutches used in a transmission from overheating, thereby improving vehicle durability and the experience of driving the vehicle.

The above and other objects can be accomplished by the provision of a startup control method for a hybrid vehicle, the method including judging, by a controller, whether starting motion of the vehicle is possible using only a motor or whether starting motion of the vehicle additionally requires power of an engine, preparing the power of the engine, by the controller, by igniting the engine and also initiating engagement of a driving gear when it is judged that motion start additionally requires the power of the engine, and linearly increasing a torque of the motor to a maximum value, and completing the remainder of a motion start process by increasing a torque of a clutch while increasing a torque of the engine, by the controller, when transmission of the power of the engine to a drive wheel becomes possible via the preparation of the power of the engine.

The judging may include judging that motion start additionally requires the power of the engine when a driver-required torque exceeds a predetermined reference torque, or when a state of charge of a battery is below a predetermined reference amount.

In the preparing, the motor torque may be linearly increased, and a rate of increase in the motor torque may be stored.

In the completing, it may be judged that the power of the engine is transmittable to the drive wheel when an engine RPM reaches an idle RPM and the engagement of the driving gear is completed.

Generation of electric power may be initiated by a hybrid starter generator (HSG) connected to the engine when the engine RPM reaches the idle RPM.

In the completing, the engine torque may be increased by an amount equivalent to shortage calculated by subtracting the motor torque from the driver-required torque.

In the completing, the clutch torque may be controlled so that a sum torque of the motor torque and the clutch transmission torque is linearly increased consistently with the stored rate of increase in the motor torque.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to form of the present disclosure, examples of which are illustrated in the accompanying drawings. Wherever possible, the same reference numbers will be used throughout the drawings to refer to the same or like parts.

Figure 1:
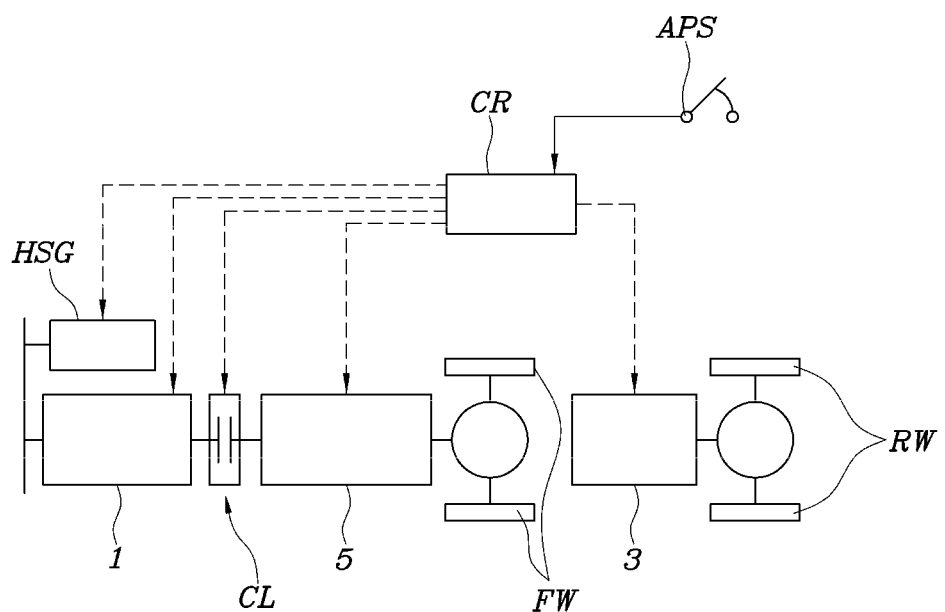
FIG. 1 is a view illustrating a configuration of a hybrid vehicle.

Referring to FIG. 1, a hybrid vehicle is configured in such a manner that front wheels FW are driven by the power of an engine 1 and rear wheels RW are driven by the power of a motor 3. The front wheels FW transmit the power from the engine 1 to the drive wheels via a transmission 5. The transmission 5 may be, for example, a Dual Clutch Transmission (DCT) or an Automated Manual Transmission (AMT), and includes a clutch CL.

A hybrid Starter Generator (HSG) is connected to the engine 1, so as to enable startup of the engine 1 or the generation of electric power using the power of the engine 1.

Here, the engine, HSG, clutch, transmission, and motor are controlled by a single controller CR. The controller CR is configured to receive a signal from an Accelerator Position Sensor (APS) in order to receive a driver's demand.

Of course, the controller CR may be divided into a plurality of individual controllers.

Figure 2:
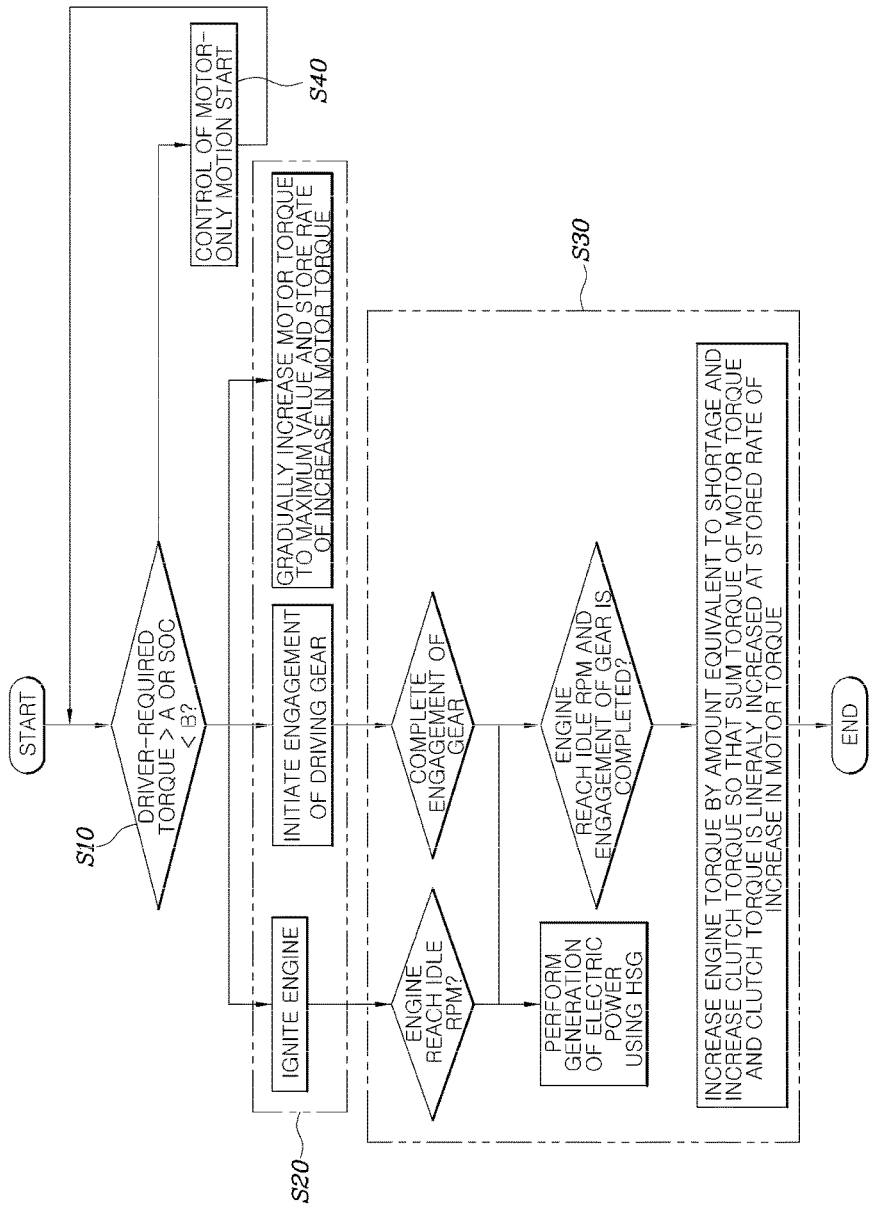
FIG. 2 is a view illustrating one form of a startup control method for a hybrid vehicle.
Figure 3:
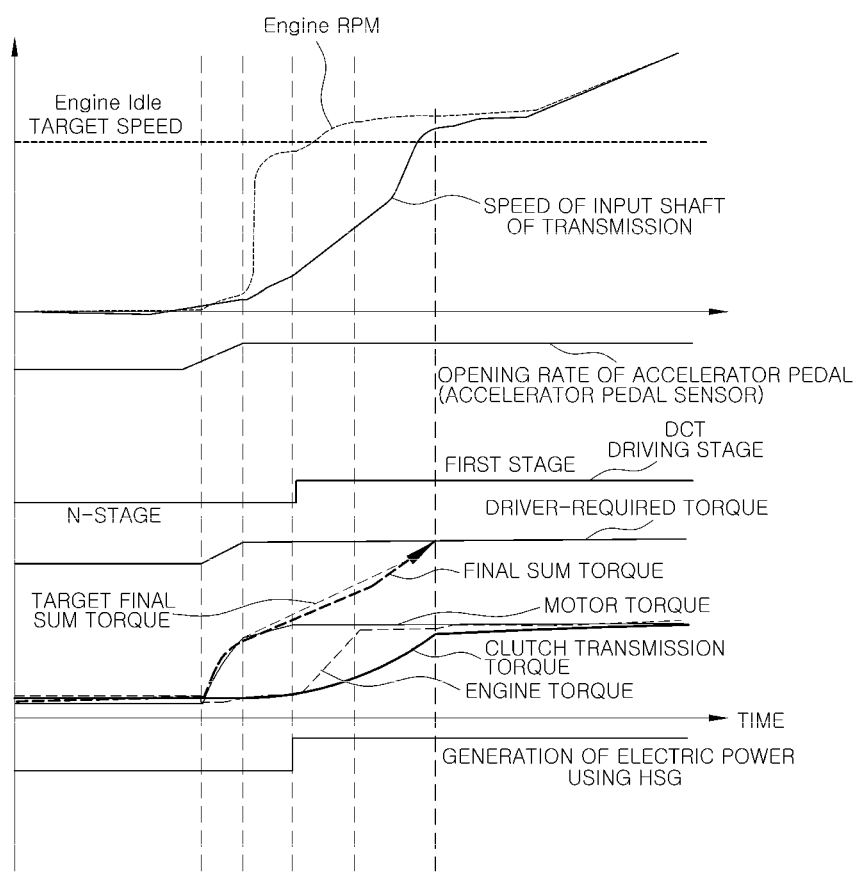
FIG. 3 is a graph illustrating the behavior of the vehicle over time, resulting from the control method of FIG. 2.

Referring to FIG. 2, in one form of a startup control method for a hybrid vehicle, the control method includes an engine necessity judgment step S10 in which the controller CR judges whether motion start is possible using only the motor or additionally requires the power of the engine when the vehicle starts motion, an engine power preparation step S20 in which the controller CR ignites the engine and also initiates the engagement of a driving gear when the judgment result of the engine necessity judgment step S10 is that motion start additionally requires the power of the engine, and then linearly increases the torque of the motor to the maximum value, and a motion start completion step S30 in which the controller CR increases the torque of a clutch while increasing the torque of the engine when transmission of the power of the engine to the drive wheels becomes possible owing to the engine power preparation step S20, so as to complete the remainder of the motion start process.

That is, in the present disclosure, when motion start of the vehicle is initiated as the driver steps on an accelerator pedal, it is first judged whether the vehicle can start moving using only the motor in the engine necessity judgment step S10. Then, when the judgment result is that the power of the engine is additionally required, motion start of the vehicle is initiated using the power of the motor while the power of the engine is ready in the engine power preparation step S20. When the power of the engine is completely ready, as the engine torque and the clutch torque are controlled to add the power of the engine to the motion start of the vehicle, the motion start process is completed.

In the engine necessity judgment step S10, the controller judges that motion start additionally requires the power of the engine when a driver-required torque exceeds a predetermined reference torque, or when a State of Charge (SOC) of a battery is below a predetermined reference amount.

Here, the driver-required torque may be known via the APS signal input to the controller, and the reference torque for comparison with the driver-required torque may be set, within a torque that may be exerted by the motor, to a relatively low value in vehicles that require rapid startup, or to a relatively high value in other vehicles, depending on the design of individual vehicles.

In addition, the reference amount for comparison with the SOC of the battery may be set to a charge amount that enables a judgment of whether motion start is sufficiently performed using only the motor.

Of course, when the driver-required torque does not exceed the predetermined reference torque or when the SOC of the battery is not below the predetermined reference amount, a motor-only motion start step S40 of starting motion of the vehicle using only the motor is performed. Even when starting motion using only the motor, the engine necessity judgment step may be repeatedly performed so as to enable immediate switching to the engine power preparation step when needed.

In the engine power preparation step S20, the motor torque is linearly increased, and the rate of increase in the motor torque is stored.

At this time, the motor torque is linearly increased to the maximum value that may be exerted by the motor, which may minimize overheating of the clutch that will transmit the power of the engine as much as possible.

In the motion start completion step S30, when the engine RPM reaches the idle RPM and the engagement of a driving gear is completed, it is judged that the power of the engine is transmittable to the drive wheels.

Here, the driving gear is typically a first gear.

When the engine RPM reaches the idle RPM, generation of electric power may be initiated by the HSG connected to the engine.

That is, it is necessary to attain electric power required to drive the motor as much as possible.

In the motion start completion step S30, the engine torque is increased by an amount equivalent to shortage calculated by subtracting the motor torque from the driver-required torque, so as to achieve the driver-required torque.

In addition, in the motion start completion step S30, the clutch torque is controlled so that the sum torque of the motor torque and the clutch transmission torque is linearly increased consistently with the stored rate of increase in the motor torque.

That is, by allowing the engine torque to be additionally provided to the drive wheels while continuously maintaining the linear rate of increase in the motor torque after motion has commenced by driving only the motor in the engine power preparation step S20, no perceptible variation in acceleration occurs while the vehicle starts moving and a progressive and linear acceleration sensation is realized, resulting in an improved vehicle driving experience.

As is apparent from the above description, according to the present disclosure, in a hybrid vehicle in which some drive wheels are driven by a motor and the other drive wheels are driven by an engine, a startup control method for the hybrid vehicle ensures rapid startup and a linear shift sensation and prevents clutches used in a transmission from overheating, thereby improving vehicle durability and the experience of driving the vehicle.

Although forms of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A startup control method for a hybrid vehicle, the method comprising:
   judging, by a controller, whether starting motion of the vehicle is possible using only a motor or whether starting motion of the vehicle additionally requires power of an engine;
   preparing the power of the engine, by the controller, by igniting the engine and also initiating engagement of a driving gear when it is judged that starting motion of the vehicle additionally requires the power of the engine, and linearly increasing a torque of the motor to a maximum value; and
   completing the remainder of a motion start process by increasing a torque of a clutch while increasing a torque of the engine, by the controller, when transmission of the power of the engine to a drive wheel becomes possible via the preparation of the power of the engine.

2. The method according to claim 1, wherein the judging includes judging that starting motion of the vehicle additionally requires the power of the engine when a driver-required torque exceeds a predetermined reference torque, or when a state of charge of a battery is below a predetermined reference amount.

3. The method according to claim 2, wherein, in the preparing, the motor torque is linearly increased, and a rate of increase in the motor torque is stored.

4. The method according to claim 3, wherein, in the completing, it is judged that the power of the engine is transmittable to the drive wheel when an engine RPM reaches an idle RPM and the engagement of the driving gear is completed.

5. The method according to claim 4, wherein generation of electric power is initiated by a hybrid starter generator (HSG) connected to the engine when the engine RPM reaches the idle RPM.

6. The method according to claim 4, wherein, in the completing, the engine torque is increased by an amount equivalent to shortage calculated by subtracting the motor torque from the driver-required torque.

7. The method according to claim 6, wherein, in the completing, the clutch torque is controlled so that a sum torque of the motor torque and the clutch transmission torque is linearly increased consistently with the stored rate of increase in the motor torque.

* * * * *